US011029467B2

(12) United States Patent
Muendel et al.

(10) Patent No.: US 11,029,467 B2
(45) Date of Patent: Jun. 8, 2021

(54) FIBER COUPLER

(71) Applicant: Lumentum Operations LLC, Milpitas, CA (US)

(72) Inventors: Martin H. Muendel, Oakland, CA (US); Richard D. Faulhaber, San Carlos, CA (US); James Lefort, Milpitas, CA (US); James J. Morehead, Oakland, CA (US); Vincent Petit, Cupertino, CA (US); Simonette Pierrot, Dietikon (CH); Kyle R. Schneider, Milpitas, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/587,834

(22) Filed: Sep. 30, 2019

(65) Prior Publication Data

US 2020/0116935 A1    Apr. 16, 2020

Related U.S. Application Data

(60) Provisional application No. 62/744,492, filed on Oct. 11, 2018.

(51) Int. Cl.
| | |
|---|---|
| *G02B 6/255* | (2006.01) |
| *G02B 6/122* | (2006.01) |
| *G02B 6/42* | (2006.01) |
| *C03C 3/04* | (2006.01) |
| *G02B 6/38* | (2006.01) |
| *G02B 6/12* | (2006.01) |

(52) U.S. Cl.
CPC ............ *G02B 6/255* (2013.01); *C03C 3/04* (2013.01); *G02B 6/122* (2013.01); *G02B 6/3887* (2013.01); *G02B 6/4204* (2013.01); *C03B 2201/06* (2013.01); *G02B 2006/12147* (2013.01)

(58) Field of Classification Search
None
See application file for complete search history.

(56) References Cited

U.S. PATENT DOCUMENTS

| | | | | |
|---|---|---|---|---|
| 3,883,223 | A * | 5/1975 | Hudson | G02B 6/2817 385/24 |
| 9,588,296 | B2 | 3/2017 | Heaton et al. | |
| 9,885,830 | B2 | 2/2018 | Heaton et al. | |
| 2002/0168140 | A1* | 11/2002 | Asano | G02B 6/2551 385/34 |

(Continued)

*Primary Examiner* — Chad H Smith
(74) *Attorney, Agent, or Firm* — Harrity & Harrity, LLP

(57) ABSTRACT

A method may include performing an active alignment to enable optical coupling between a first optical fiber and a second optical fiber via an imaging structure. An end of the first optical fiber may be at a first location on a first surface of the imaging structure. The first location may be a first transverse offset distance from an axis of the imaging structure. An end of the second optical fiber may be at a second location of the first surface of the imaging structure. The second location may be a second transverse offset distance from the axis of the imaging structure. The method may include fusion splicing the end of the first optical fiber at the first location on the first surface of the imaging structure, and fusion splicing the end of the second optical fiber at the second location on the first surface of the imaging structure.

20 Claims, 7 Drawing Sheets

(56) References Cited

U.S. PATENT DOCUMENTS

| 2008/0219679 A1* | 9/2008 | Takada | G02B 6/32 |
| | | | 398/201 |
| 2012/0045169 A1* | 2/2012 | Hu | G02B 6/29311 |
| | | | 385/33 |
| 2017/0031098 A1* | 2/2017 | Heaton | G02B 6/125 |

* cited by examiner

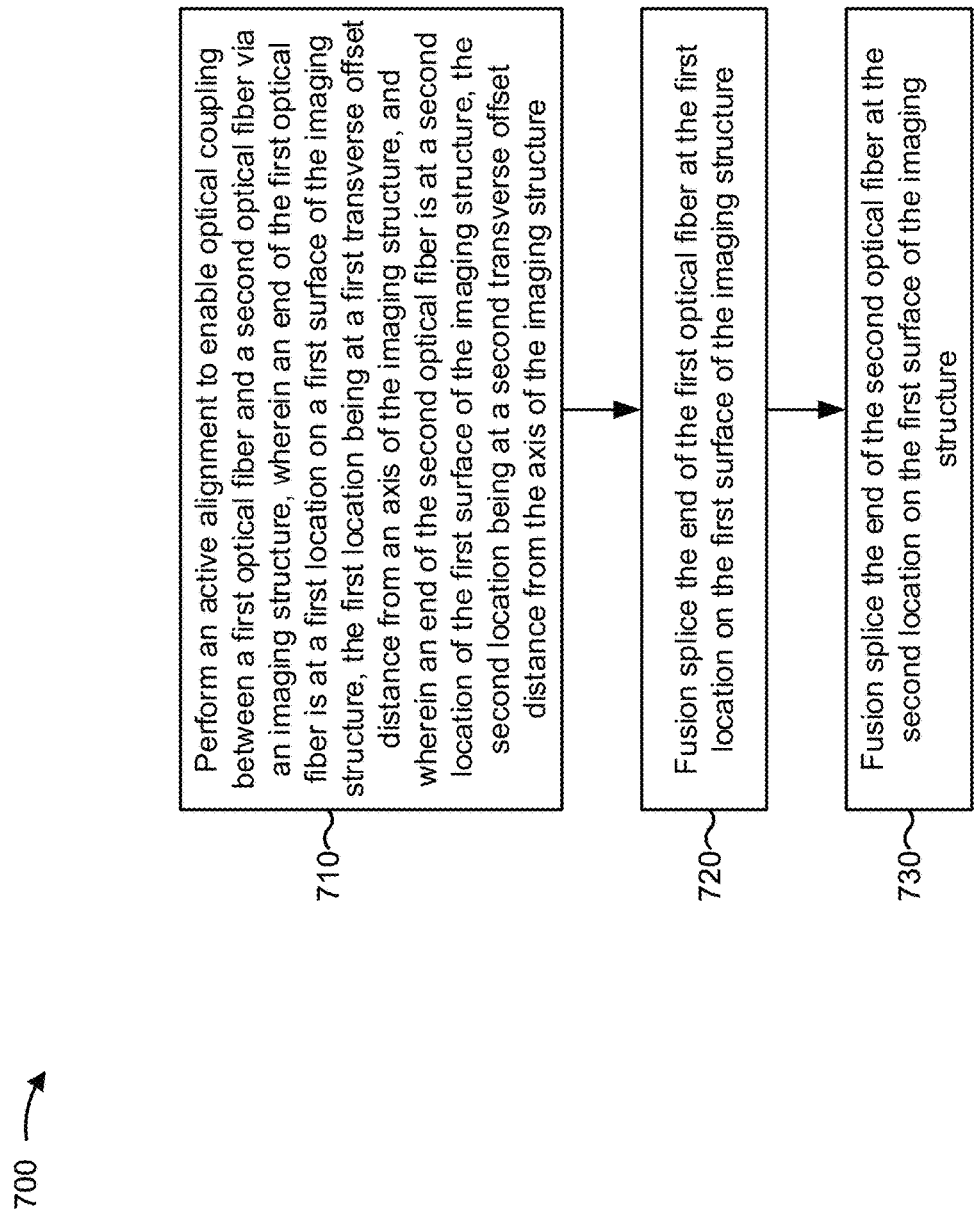

FIBER COUPLER

RELATED APPLICATION

This application claims priority to U.S. Provisional Patent Application No. 62/744,492, filed on Oct. 11, 2018, the content of which is incorporated by reference herein in its entirety.

TECHNICAL FIELD

The present disclosure relates to a fiber coupler and, more particularly, to a fiber coupler capable of coupling light reflectively from a first optical fiber into a second optical fiber without free-space optics.

BACKGROUND

A fiber coupler is an optical device with one or more input fibers and one or more output fibers. In general, in operation of a fiber coupler, light launched at an input port by a given input fiber is provided to one or more output ports for coupling in one or more respective output fibers.

SUMMARY

According to some possible implementations, a method may include providing a first optical fiber and a second optical fiber such that an end of the first optical fiber is at a fixed position with respect to an end of the second optical fiber; performing an active alignment to enable optical coupling between the first optical fiber and the second optical fiber via an imaging structure, wherein, as a result of the active alignment: an end of the first optical fiber is at a first location on a first surface of the imaging structure, wherein the first location is at a first transverse offset distance from an axis of the imaging structure, and an end of the second optical fiber is at a second location of the first surface of the imaging structure, wherein the second location is at a second transverse offset distance from the axis of the imaging structure; and concurrently fusion splicing the end of the first optical fiber at the first location on the first surface and the end of the second optical fiber at the second location on the first surface.

According to some possible implementations, a method may include fusion splicing an end of a first optical fiber at a first location on a first surface of an imaging structure, wherein the first location is at a first transverse offset distance from an axis of the imaging structure; performing an active alignment to enable optical coupling between the first optical fiber and a second optical fiber via the imaging structure, wherein, as a result of the active alignment, an end of the second optical fiber is at a second location on the first surface of the imaging structure, wherein the second location is at a second transverse offset distance from the axis of the imaging structure; and fusion splicing the end of the second optical fiber at the second location on the first surface of the imaging structure.

According to some possible implementations, a method may include performing an active alignment to enable optical coupling between a first optical fiber and a second optical fiber via an imaging structure, wherein an end of the first optical fiber is at a first location on a first surface of the imaging structure, the first location being at a first transverse offset distance from an axis of the imaging structure, and wherein an end of the second optical fiber is at a second location on the first surface of the imaging structure, the second location being at a second transverse offset distance from the axis of the imaging structure; fusion splicing the end of the first optical fiber at the first location on the first surface of the imaging structure; and fusion splicing the end of the second optical fiber at the second location on the first surface of the imaging structure.

According to some possible implementations, a fiber coupler may include a first fiber to launch light at a first location on a first surface of an imaging structure, wherein the first location is at a first transverse offset distance from an axis of the imaging structure; the imaging structure to: receive the light on a second surface of the imaging structure, and reflect at least a portion of the light from the second surface of the imaging structure such that the at least a portion of the light is imaged at a second location on the first surface of the imaging structure, wherein the second location is at a second transverse offset distance from the axis of the imaging structure; and a second fiber to receive the at least a portion of the light imaged at the second location on the first surface of the imaging structure.

BRIEF DESCRIPTION OF THE DRAWINGS

FIGS. 5-7 are flowcharts of various example processes for fabricating the fiber coupler described herein.

DETAILED DESCRIPTION

Figure 1:
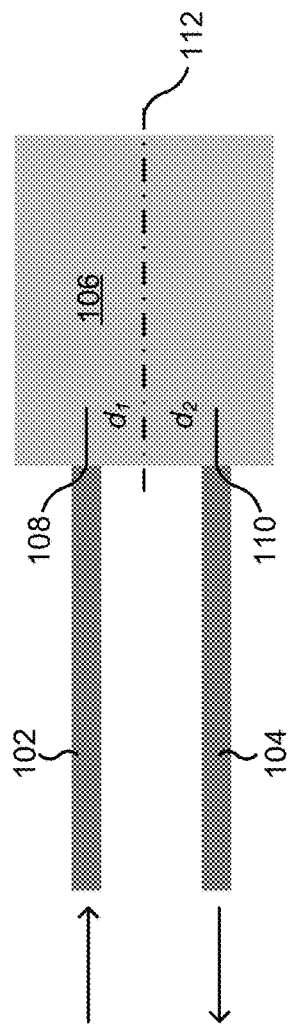
FIG. 1 is a diagram of an example implementation of a fiber coupler described herein.

The following detailed description of example implementations refers to the accompanying drawings. The same reference numbers in different drawings may identify the same or similar elements.

Some optical operations are well served in reflection. Such operations include, for example, wavelength filtering, wavelength beam combining, and pump/signal multiplexing using a thin-film filter; and mode-locking of a fiber lasers using a saturable absorber (e.g., a semiconductor Bragg reflector (SBR), a semiconductor saturable absorber mirror (SESAM), and/or the like), among others. However, it is difficult to implement reflective geometries to couple from a first optical fiber to a second optical fiber without using free-space optics (e.g., exiting the first optical fiber, collimating in a first lens, implementing an optical operation on the free-space collimated beam, re-focusing in a second lens, and coupling into the second optical fiber). The use of free-space optics imposes a number of challenges, such as maintaining optical alignment on an optical path through the free-space optics, preventing possible contamination on one or more surfaces of the free-space optics, and adding cost. It is therefore desirable to develop a fiber-based system in which light remains confined within fiber or within a solid material (e.g., glass) throughout an optical path associated with a reflective geometry used to couple light from a first optical fiber to a second optical fiber.

Some implementations described herein provide a fiber coupler capable of coupling light reflectively from a first optical fiber into a second optical fiber without free-space optics. In some implementations, the fiber coupler may include a first fiber to launch light at a first location on a first surface of an imaging structure. Here, the first location may be at a first transverse offset distance from an axis of the imaging structure. The imaging structure of the fiber coupler may receive the light on a second surface of the imaging structure, and reflect at least a portion of the light from the second surface of the imaging structure. Here, the imaging structure reflects the at least a portion of the light such that the at least a portion of the light is imaged at a second location on the first surface of the imaging structure, the second location being at a second transverse offset distance from the axis of the imaging structure. The fiber coupler may further include a second fiber to receive the at least a portion of the light imaged at the second location on the second surface of the imaging structure. The fiber coupler described herein enables optical coupling in which light remains confined (e.g., within an optical fiber or within a solid material) throughout an optical path. That is, the fiber coupler described herein enables optical coupling from the first fiber to the second fiber without free-space optics. In some implementations, the fiber coupler described herein allows optical alignment to be maintained, ensures high reliability (e.g., by avoiding the possibility of surface contamination) and achieves a relatively low cost (e.g., as compared to free-space optics). Various processes for manufacturing such a fiber coupler are also provided below.

FIG. 1 is a diagram of an example implementation of a fiber coupler 100. As shown in FIG. 1, fiber coupler 100 may include a first fiber 102, a second fiber 104, and an imaging structure 106.

First fiber 102 includes an optical fiber capable of launching light at a first location 108 on a first surface of imaging structure 106. In some implementations, first fiber 102 may be a multi-mode fiber, or may be a single-mode fiber. In some implementations, first fiber 102 may also be a single-clad fiber, or may be multiple-clad fiber. As shown in FIG. 1, first location 108 may be at a first transverse offset distance ($d_1$) from an axis 112 of imaging structure 106. As described herein, a transverse offset distance is a distance in a direction perpendicular to a direction of propagation of light. In some implementations, an end of first fiber 102 may be fusion-spliced to the first surface of imaging structure 106 at first location 108.

Second fiber 104 includes an optical fiber capable of receiving the at least a portion of the light imaged at second location 110 on the first surface of imaging structure 106. In some implementations, second fiber 104 may be a multi-mode fiber, or may be a single-mode fiber. In some implementations, second fiber 104 may be a single-clad fiber or may be a multiple-clad fiber. As shown in FIG. 1, second location 110 may be at a second transverse offset distance ($d_2$) from axis 112 of imaging structure 106. In some implementations, an end of second fiber 104 may be fusion-spliced to the first surface of imaging structure 106 at second location 110. In some implementations, the second transverse offset distance may match the first transverse offset distance. That is, in some implementations, the second transverse offset distance may be approximately the same as the first transverse offset distance. Alternatively, the second transverse offset distance may be different from the first transverse offset distance. Additionally, second location 110 may be diametrically opposed to first location 108 with respect to axis 112, or may be at another rotational position with respect to axis 112.

Imaging structure 106 includes an optical element capable of receiving light, launched by first fiber 102 at first location 108 on the first surface of imaging structure 106, on a second surface of imaging structure 106, and reflecting at least a portion of the light from the second surface of imaging structure 106 such that the at least a portion of the light is imaged at the second location 110 on the first surface of imaging structure 106.

In some implementations, imaging structure 106 provides two-dimensional imaging. That is, imaging structure 106 may provide imaging in a dimension that is parallel to the first and second transverse offset distances (e.g., a dimension along a vertical direction on a plane of the page of FIG. 1) and in a dimension that is perpendicular to the first and second transverse offset distances (e.g., a dimension perpendicular to the plane of the page of FIG. 1). This differs from coupling of planar waveguides using a waveguide structure, where imaging is provided in only one dimension.

In some implementations, imaging structure 106 may be a graded-index structure with a parabolic transverse refractive index profile. An example implementation of fiber coupler 100 in which imaging structure 106 is a graded-index structure is described below with regard to FIG. 2.

In some implementations, imaging structure 106 may be a curved endcap structure with a fixed refractive index. An example implementation of fiber coupler 100 in which imaging structure 106 is a curved endcap structure is described below with regard to FIG. 3.

The number and arrangement of components shown in FIG. 1 are provided as an example. In practice, fiber coupler 100 may include additional components, fewer components, different components, or differently arranged components than those shown in FIG. 1. Additionally, or alternatively, a set of components (e.g., one or more components) of fiber coupler 100 may perform one or more functions described as being performed by another set of components of fiber coupler 100.

Figure 2:
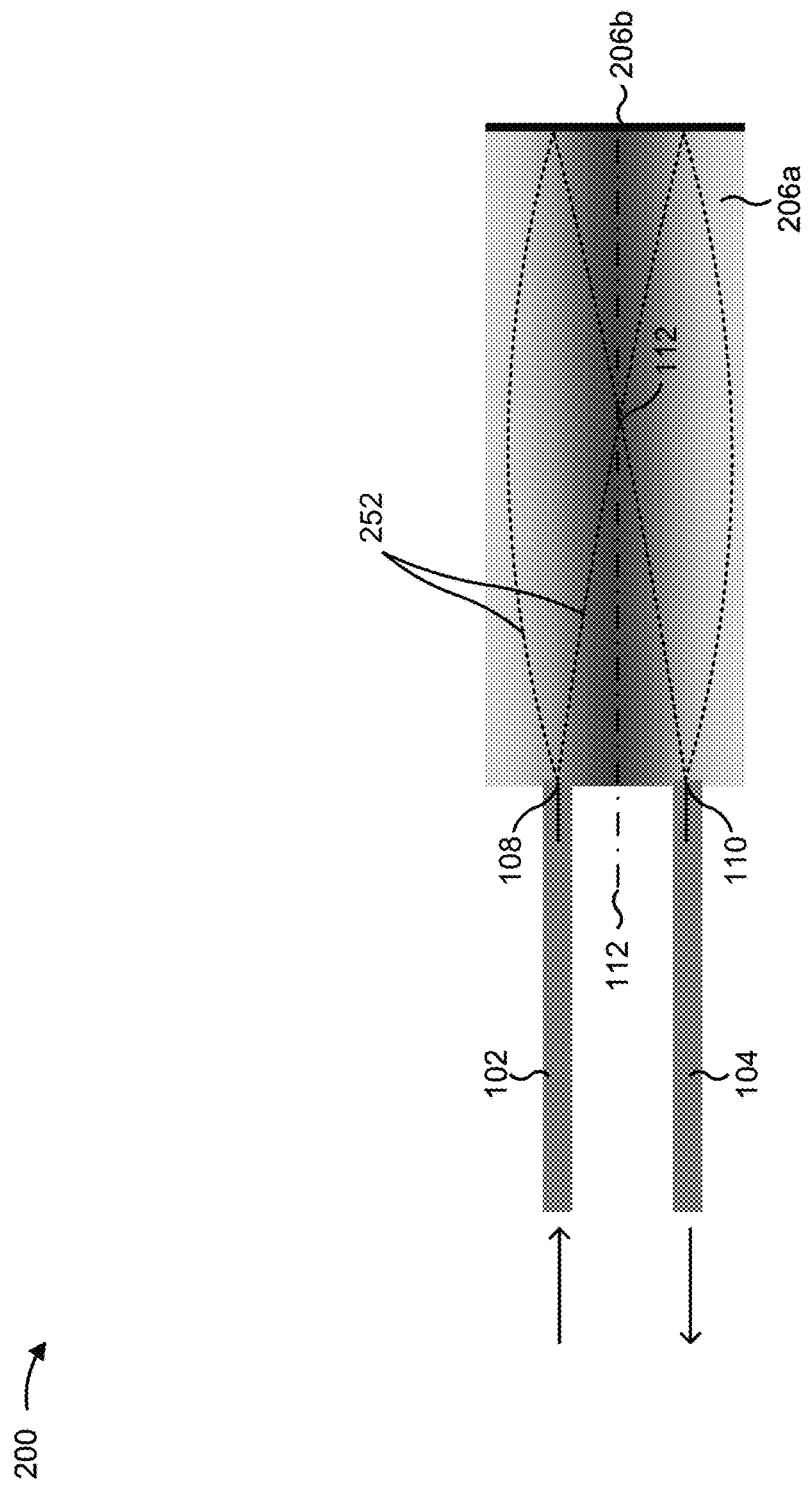
FIG. 2 is a diagram of an example implementation in which an imaging structure of a fiber coupler is a graded-index structure.

As described above, in some implementations, imaging structure 106 may include a graded-index structure with a parabolic or near-parabolic refractive index profile. FIG. 2 is a diagram of an example implementation in which imaging structure 106 of fiber coupler 100 is a graded-index structure. The example implementation shown in FIG. 2 is herein referred to as fiber coupler 200. As shown in FIG. 2, the imaging structure 106 of fiber coupler 200 may take the form of a graded-index structure 206a and a reflective element 206b.

In some implementations, graded-index structure 206a may be formed from a doped fused silica, such as germanium-doped fused silica (e.g., similar to that used for graded-index multi-mode fibers for data communications). Notably, while a conventional soft-glass graded-index lens could be used, in practice, the soft-glass graded-index lens would not fusion-splice well to fused-silica optical fibers due to the difference in melting points. In some implementations, fiber coupler 200 may be used for coupling in a high power scenario (e.g., greater than or equal to approximately 100 Watts) meaning that no glue, no soft glass, no mechanical fixturing or mechanical contact between discrete optical components should be used. These constraints may require a fully fused structure, meaning that graded-index structure 206a should be fused-silica-based. In such a case, a graded-index cane (e.g., a drawn rod that is larger in diameter than flexible fiber, which has a maximum diameter of 1 millimeter) that is drawn from a doped fused-silica graded-index preform may be used. In some implementations, graded-index structure 206a may comprise a core region with a radially parabolic or near-parabolic refractive-index profile, wherein if a best-fit is applied to a measured index profile of the core using the rotationally symmetric function $(n(r)/n_0)^2=1-2\Delta(r/R)^\alpha$, where r is the radial variable, R is the radius of the core or of the region of the core in which a majority of the transmitted power is present (e.g., an 86%-power-enclosed radius), and the best-fit is applied by varying $n_0$, $\Delta$ and $\alpha$, then a parabolic index profile may be defined as one in which the exponent $\alpha$ equals 2, and a near-parabolic index profile as one in which $\alpha$ obeys the relation $1.5 \le \alpha \le 2.5$.

In operation, light enters fiber coupler 200 via first fiber 102. As described above, first fiber 102 may be fusion-spliced off-axis at first location 108 on a first surface of graded-index structure 206a (e.g., illustrated as a left surface in FIG. 2). In some implementations, a diameter of graded-index structure 206a may be larger than a diameter of first fiber 102. As shown by beam path 252 in FIG. 2, the light propagates through graded-index structure 206a and is collimated on a second surface of graded-index structure 206a (e.g., illustrated as a right surface in FIG. 2). Here, due to the transverse offset of the light at the launch (e.g., at a distance $d_1$ (not shown in FIG. 2) from an axis 112 of graded-index structure 206a) and the parabolic refractive index profile of graded-index structure 206a, the beam is tilted at the second surface (with an angle equal to $d_1/f$ radians, where $f$ is a focal length of the graded-index material). Next, the light is at least partially reflected by reflective element 206b, which may be a reflective coating or other reflective means on the second surface of graded-index structure 206a. As further shown, after the reflected portion of the light passes back through graded-index structure 206a, the reflected portion of the light is re-imaged at or near (e.g., within a few hundred microns of) the first surface of graded-index structure 206a, displaced by transverse offset distance $d_2$ on an opposite side of axis 112 of graded-index structure 206a. Second fiber 104 is fusion-spliced to graded-index structure 206a at second location 110 on the first surface of graded-index structure 206a (i.e., near the location where the reflected portion of the light is imaged), and second fiber 104 captures the re-imaged reflected portion of the light.

As a numerical example, using light with wavelength on the order of 1 micron, first fiber 102 may be a step-index multimode fiber with core diameter of 135 microns, clad diameter 155 microns, and numerical aperture (NA) 0.22, and second fiber 104 may be a step-index multimode fiber with core diameter 150 microns, clad diameter 250 microns, and NA 0.22. Here, a receiving area of second fiber 104 should be slightly larger than an emitting area of first fiber 102 because the imaging will inherently be 1:1 (i.e., no magnification/demagnification) and it is generally accepted in the art of multimode-beam coupling to provide some margin on the order of 10 wavelengths in order to ensure low loss. In this example, graded-index structure 206a may have a doped core diameter of 1.65 millimeters (mm), an undoped clad diameter of 2.0 mm, a roughly parabolic index profile with an NA of 0.275, an effective focal length of 3.0 mm, and a physical (quarter-pitch) length of 6.96 mm. Here, the offsets of the fusion splices from axis 112 of graded-index structure 206a may be in a range from approximately 200 microns to approximately 400 microns. The diameter of the beam on the second surface of graded-index structure 206a may be, for a 0.15 radian half-angle input divergence, approximately 0.9 mm. Here, graded-index structure 206a may be fabricated using a standard 0.275 NA graded-index preform that may be drawn down to a standard 62.5/125 micron OM1 multimode data communications fiber.

In one embodiment, reflective element 206b is planar and perpendicular to axis 112, and $d_1$ is equal to $d_2$, and first location 108 is diametrically opposed to second location 110 with respect to axis 112. In another embodiment, reflective element 206b is planar but not perpendicular to axis 112, and either $d_1$ is not equal to $d_2$ or first location 108 is not diametrically opposed to second location 110 (or both).

The number and arrangement of components shown in FIG. 2 are provided as an example. In practice, fiber coupler 200 may include additional components, fewer components, different components, or differently arranged components than those shown in FIG. 2. Additionally, or alternatively, a set of components (e.g., one or more components) of fiber coupler 200 may perform one or more functions described as being performed by another set of components of fiber coupler 200.

Figure 3:
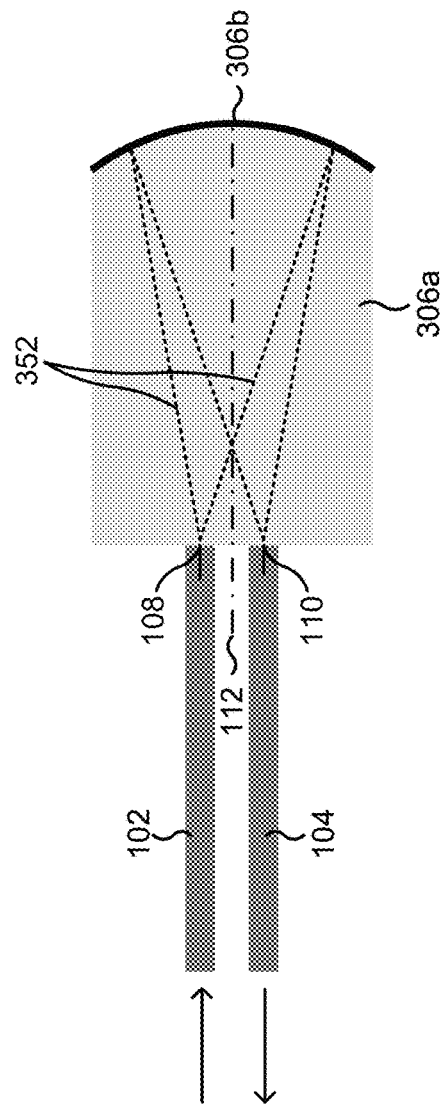
FIG. 3 is a diagram of an example implementation in which an imaging structure of a fiber coupler is a curved endcap structure.

As described above, in some implementations, imaging structure 106 may include a curved endcap structure. FIG. 3 is a diagram of an example implementation in which imaging structure 106 of fiber coupler 100 includes a curved endcap structure. The example implementation shown in FIG. 3 is herein referred to as fiber coupler 300. As shown in FIG. 3, the imaging structure 106 of fiber coupler 300 may take the form of a curved endcap structure 306a and a reflective element 306b.

In some implementations, curved endcap structure 306a may be formed from a material having a fixed refractive index. For example, curved endcap structure 306a may be formed from undoped fused silica. As shown in FIG. 3, curved endcap structure 306a has a curved second surface (e.g., the right surface in FIG. 3). In some implementations, a center of curvature of the curved second surface may be located on or near a first surface of curved endcap structure 306a (e.g., the left surface in FIG. 3) so that points in the input plane are imaged back to that same plane.

In operation, light enters fiber coupler 300 via first fiber 102. As described above, first fiber 102 may be fusion-spliced off-axis at first location 108 on a first surface of curved endcap structure 306a (e.g., illustrated as a left surface in FIG. 3). In some implementations, a diameter of curved endcap structure 306a may be larger than a diameter of first fiber 102. As shown by beam path 352 in FIG. 3, the light propagates through curved endcap structure 306a and is received at a second surface of curved endcap structure 306a (e.g., illustrated as a right surface in FIG. 3). Next, the light is at least partially reflected by reflective element 306b, which may be a reflective coating or other reflective means on the second surface of curved endcap structure 306a. Here, the curved second surface of curved endcap structure 306a causes the reflected portion of the light, after passing back through curved endcap structure 306a, to be re-imaged near (e.g., within a few hundred microns of) the first surface of curved endcap structure 306a, displaced by transverse offset distance $d_2$ on an opposite side of axis 112 of curved endcap structure 306a. Second fiber 104 is fusion-spliced to curved endcap structure 306a at second location 110 on the first surface of curved endcap structure 306a (i.e., near the location where the reflected portion of the light is imaged), and second fiber 104 captures the re-imaged reflected portion of the light.

The use of curved endcap structure 306a may be advantageous in some applications in that a curved endcap may be less expensive to fabricate and/or more precise in image-plane position than a graded-index structure. As an example, a diameter of curved endcap structure 306a may be approximately 2 mm, a tip-to-tip length may be approximately 6 mm, and a radius of curvature of the curved second surface may be approximately 6 mm.

In another embodiment, the first surface of curved endcap structure 306a may be non-planar, for example comprising two mutually angled planar sections wherein first location 108 is on one planar section and second location 110 is on another planar section. In another embodiment, first fiber 102 and second fiber 104 may be non-parallel, for example slightly converging toward curved endcap structure 306a.

In another embodiment, curved endcap structure 306a may comprise a material having a variable-index structure, for example a graded-index structure having a parabolic or near-parabolic index structure similar to graded-index structure 206a. In this case, the device length that optimizes coupling from first fiber 102 to second fiber 104 is determined by a combination of the graded-index strength and the curvature of the reflective element 306b. One advantage of such a combination of graded-index structure 206a with curved endcap structure 306b is that it allows improved selectivity of the divergence of a beam transmitted through reflective element 306b by design.

The number and arrangement of components shown in FIG. 3 are provided as an example. In practice, fiber coupler 300 may include additional components, fewer components, different components, or differently arranged components than those shown in FIG. 3. Additionally, or alternatively, a set of components (e.g., one or more components) of fiber coupler 300 may perform one or more functions described as being performed by another set of components of fiber coupler 300.

Fiber coupler 100 may be used in a variety of applications. For example, a reflective element (e.g., reflective element 206b, reflective element 306b) may have a particular spectral characteristic, for example, to provide a spectrally limited passband using a notch filter. As another example, the reflective element can have a particular spectral phase characteristic, such as a Gires-Tournois interferometer, for example, for use in a short-pulse fiber oscillator. As another example, another type of reflective structure or device can be attached to the second surface of imaging structure 106 (e.g., by gluing, chemical bonding, or another bonding technique, optical contacting, or simply close proximity). The reflective structure may be, for example, a semiconductor Bragg reflector (SBR or SESAM), a bulk Gires-Tournois interferometer, a Lyot filter, a polarizer, a waveplate, an acousto-optic modulator, an electro-optic modulator, a Faraday rotator, an isolator, a circulator, a Bragg grating, a saturable absorber, or similar bulk optic, which may be secured to the fiber assembly in order to reduce cost and improve reliability and stability.

In another example, fiber coupler 100 can be configured to provide a pump-light input port and a signal-light output port for a fiber amplifier. With many fiber amplifier architectures, it is beneficial to have pump light counter-propagating with respect to signal light, and it is also beneficial to have a pump input occur in the same location as the signal output, directly at a tip of the doped amplifier fiber, without the use of fused fiber side couplers. This embodiment, which can be referred to as a pump/signal combiner, 1+1:1 combiner, or pump/signal WDM, is shown in FIG. 4.

Figure 4:
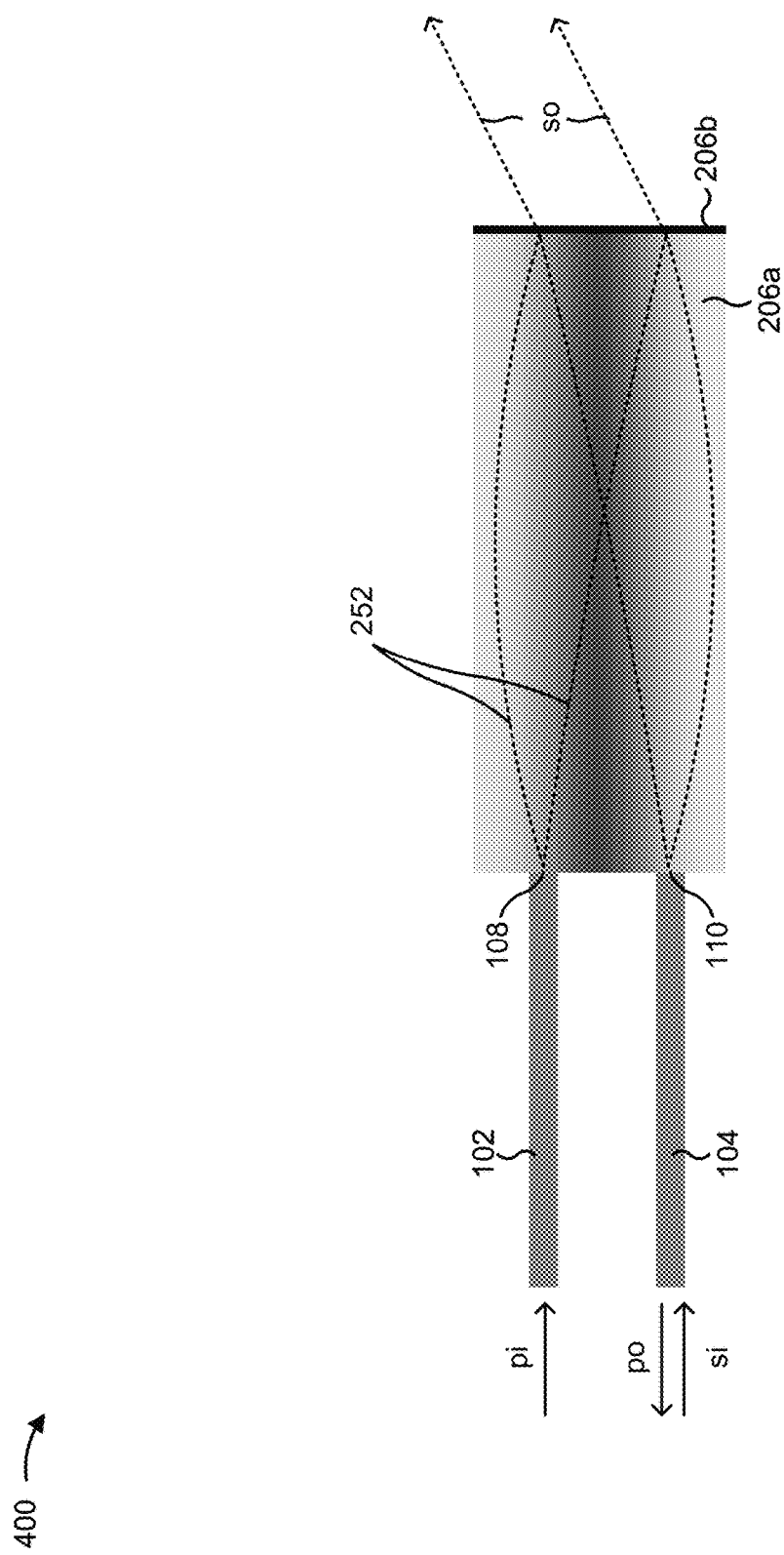
FIG. 4 is a diagram of an example implementation in which the fiber coupler is configured as a pump/signal combiner.

As illustrated in FIG. 4, in a pump/signal combiner 400, reflective element 206b at a second surface of imaging structure 106 (shown as including graded-index structure 206a and reflective element 206b in FIG. 4) may be implemented as a dichroic coating. Here, the dichroic coating may be designed to reflect a pump wavelength and transmit a signal wavelength. As a result, in operation, pump light (pi) incoming from first fiber 102 (e.g., a pump input fiber) is reflected by the dichroic coating and is imaged into second fiber 104 (e.g., an amplifier fiber) such that at least a portion of the pump light (po) propagates down second fiber 104 and energizes the amplifying medium. Signal light (si) meanwhile propagates through the amplifying medium of second fiber 104 (e.g., reaching maximum power at an end of second fiber 104 where second fiber 104 is spliced to graded-index structure 206a). The signal light is collimated by graded-index structure 206a and then at least a portion of the signal light (so) exits transmissively through the dichroic coating. Thereafter, the signal light can propagate through free-space, or can be coupled back into another fiber, for example using another graded-index structure 206a that is butted against or bonded to the dichroic coating.

In some implementations, the pump input fiber (i.e., first fiber 102) may be multi-mode, and the amplifier fiber (i.e., second fiber 104) may be a double-clad or triple-clad, large-mode-area (LMA) core fiber, wherein the pump light is carried in a pump cladding region and the signal light is carried in the LMA core and is preferably in a single mode. In another implementation, both the pump input fiber and the amplifier fiber may be single-clad and single-mode, and both the pump light and the signal light may be in a single mode. In another implementation, fiber coupler 100 may be used for coupling both the pump light and the signal light into the amplifier fiber (e.g., rather than coupling the signal light out), in which case the labels associated with the signal light shown (and the corresponding directions of the arrows associated with the signal light) in FIG. 4 would be exchanged.

The number and arrangement of components shown in FIG. 4 are provided as an example. In practice, pump/signal combiner 400 may include additional components, fewer components, different components, or differently arranged components than those shown in FIG. 4. Additionally, or alternatively, a set of components (e.g., one or more components) of pump/signal combiner 400 may perform one or more functions described as being performed by another set of components of pump/signal combiner 400.

Figure 5:
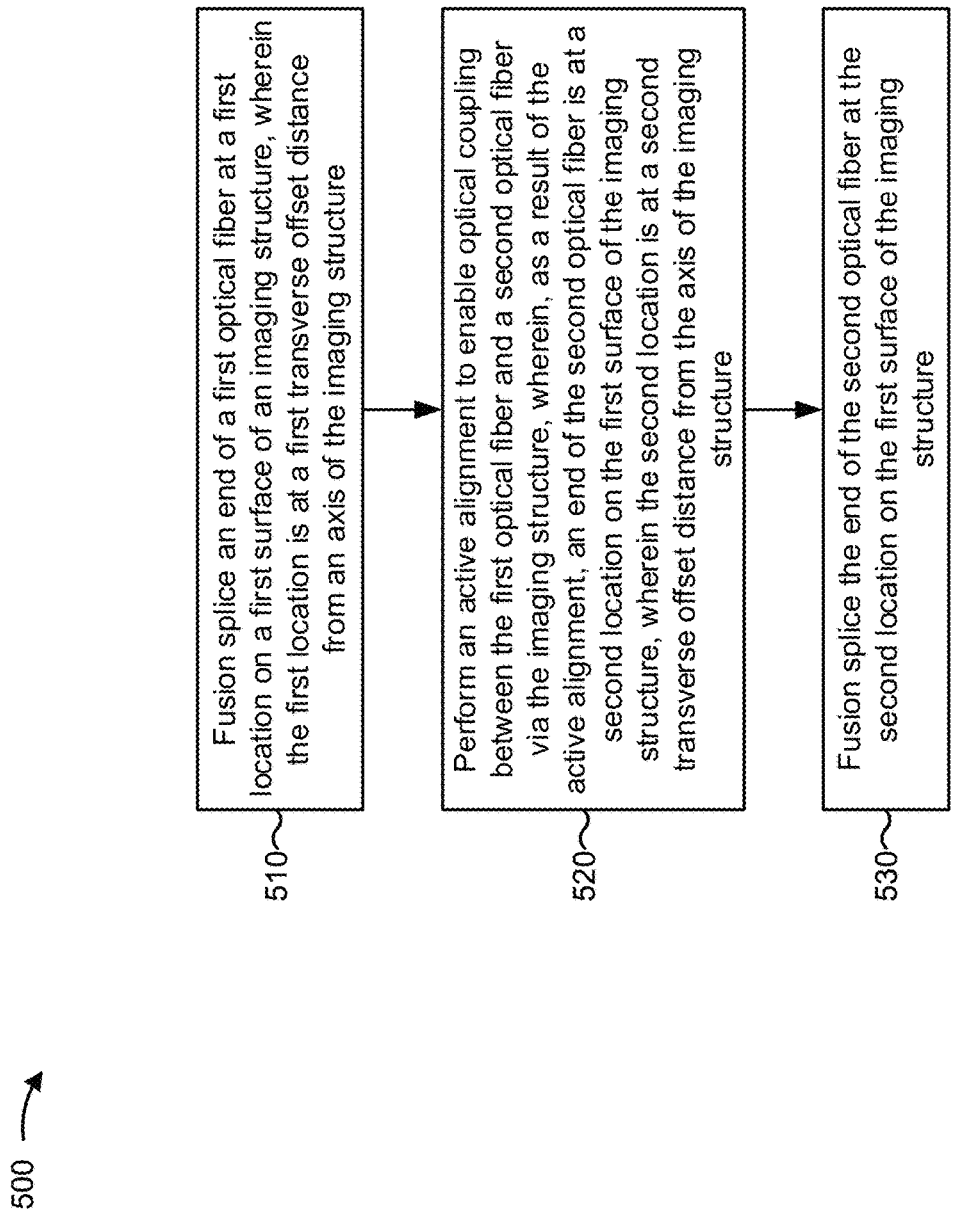

FIG. 5 is a flowchart of an example process 500 for fabricating a fiber coupler described herein (e.g., fiber coupler 100, fiber coupler 200, fiber coupler 300, and/or the like).

As shown in FIG. 5, process 500 may include fusion splicing an end of a first optical fiber at a first location on a first surface of an imaging structure, wherein the first location is at a first transverse offset distance from an axis of the imaging structure. (block 510). For example, an end of first fiber 102 may be fusion spliced at first location 108 on a first surface of imaging structure 106, as described above. In some implementations, first location 108 may be at a first transverse offset distance ($d_1$) from axis 112 of imaging structure 106 as described above.

As further shown in FIG. 5, process 500 may include performing an active alignment to enable optical coupling between the first optical fiber and a second optical fiber via the imaging structure, wherein, as a result of the active alignment, an end of the second optical fiber is at a second location on the first surface of the imaging structure, wherein the second location is at a second transverse offset distance from the axis of the imaging structure (block 520). For example, an active alignment may be performed to enable optical coupling between first fiber 102 and second fiber 104 via imaging structure 106, as described above. In some implementations, as a result of the active alignment, an end of second fiber 104 may be at second location 110 on the first surface of imaging structure 106, where second location 110 is at a second transverse offset distance ($d_2$) from axis 112 of imaging structure 106.

As further shown in FIG. 5, process 500 may include fusion splicing the end of the second optical fiber at the second location on the first surface of the imaging structure (block 530). For example, after the active alignment is performed, the end of second fiber 104 may be fusion spliced at second location 110 on the first surface of imaging structure 106.

Notably, in example process 500, the two fusion splices are performed separately (i.e., at different times). Thus, in example process 500, one fiber (e.g., first fiber 102 or second fiber 104) may be spliced to imaging structure 106 first, then the other fiber (e.g., second fiber 104 or first fiber 102) may be aligned to the correct location on imaging structure 106 (e.g., using active alignment to ensure good coupling), and then fusion spliced.

Process 500 may include additional implementations, such as any single implementation or any combination of implementations described below and/or in connection with one or more other processes described elsewhere herein.

In a first implementation, the fusion splicing of the end of first fiber 102 at first location 108 and the fusion splicing of the end of second fiber 104 at second location 110 may be performed using a carbon dioxide (CO2) laser. In some implementations, use of a CO2 laser may be advantageous because a CO2 laser may be focused specifically on a splice area for an individual splice. In some implementations, the use of a CO2 laser may ensure that a second splice does not perturb a pre-existing first splice.

In a second implementation, process 500 may further include packaging first fiber 102, second fiber 104, and imaging structure 106 to provide strain relief and/or heatsinking. For example, following the splicing operation of second fiber 104, the entire structure may be packaged in a way as to provide strain relief and/or heatsinking, for example, by potting the entire assembly or otherwise securing first fiber 102 and second fiber 104 with respect to imaging structure 106.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
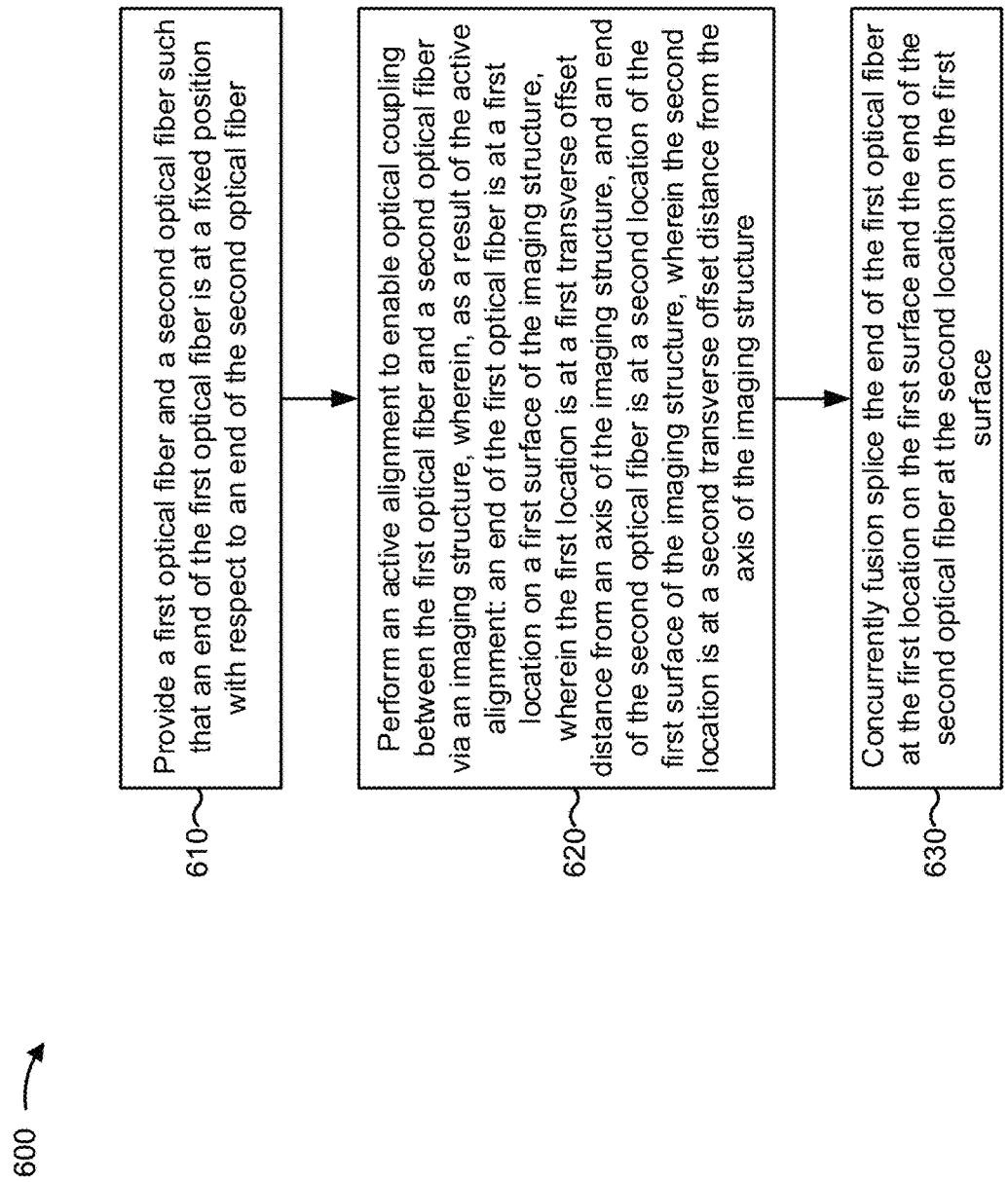

FIG. 6 is a flowchart of an example process 600 for fabricating a fiber coupler described herein (e.g., fiber coupler 100, fiber coupler 200, fiber coupler 300, and/or the like).

As shown in FIG. 6, process 600 may include providing a first optical fiber and a second optical fiber such that an end of the first optical fiber is at a fixed position with respect to an end of the second optical fiber (block 610). For example, first fiber 102 and second fiber 104 may be provided such that an end of first fiber 102 is at a fixed position with respect to an end of second fiber 104. For example, in some implementations, first fiber 102 and second fiber 104 may be held side-by-side, with their tips aligned, in a fixed position with respect to one another.

As further shown in FIG. 6, process 600 may include performing an active alignment to enable optical coupling between the first optical fiber and the second optical fiber via an imaging structure, wherein, as a result of the active alignment: an end of the first optical fiber is at a first location on a first surface of the imaging structure, wherein the first location is at a first transverse offset distance from an axis of the imaging structure, and an end of the second optical fiber is at a second location of the first surface of the imaging structure, wherein the second location is at a second transverse offset distance from the axis of the imaging structure (block 620). For example, an active alignment may be performed to enable optical coupling between first fiber 102 and second fiber 104 via imaging structure 106. In some implementations, as a result of the active alignment, an end of first fiber 102 may be at first location 108 on a first surface of imaging structure 106, where first location 108 is at a first transverse offset distance ($d_1$) from axis 112 of imaging structure 106, and an end of second fiber 104 may be at second location 110 of the first surface of imaging structure 106, where second location 110 is at a second transverse offset distance ($d_2$) from axis 112 of imaging structure 106. Here, as a result of active alignment, imaging structure 106 may be aligned in close proximity to first fiber 102 and second fiber 104 so as to achieve optimal coupling from first fiber 102 to second fiber 104.

As further shown in FIG. 6, process 600 may include concurrently fusion splicing the end of the first optical fiber at the first location on the first surface and the end of the second optical fiber at the second location on the first surface (block 630). For example, the end of first fiber 102 and the end of second fiber 104 may be concurrently fusion spliced at first location 108 on the first surface and at second location 110 on the first surface, respectively. Notably, in example process 600, the two fusion splices are performed concurrently (i.e., at essentially the same time). Thus, in example process 600, first fiber 102 and second fiber 104 are fusion spliced after active alignment.

Process 600 may include additional implementations, such as any single implementation or any combination of implementations described below and/or in connection with one or more other processes described elsewhere herein.

In a first implementation, the concurrent fusion splicing of the end of first fiber 102 at first location 108 and the end of second fiber 104 at second location 110 is performed using a single heat source (which may utilize a conventional fusion splicing technology).

In a second implementation, process 600 may further include packaging first fiber 102, second fiber 104, and imaging structure 106 to provide strain relief and/or heatsinking. For example, following the concurrent splicing operation, the entire structure may be packaged in a way as to provide strain relief and/or heatsinking, for example, by potting the entire assembly or otherwise securing first fiber 102 and second fiber 104 with respect to imaging structure 106.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 for fabricating a fiber coupler described herein (e.g., fiber coupler 100, fiber coupler 200, fiber coupler 300, and/or the like).

As shown in FIG. 7, process 700 may include performing an active alignment to enable optical coupling between a first optical fiber and a second optical fiber via an imaging structure, wherein an end of the first optical fiber is at a first location on a first surface of the imaging structure, the first location being at a first transverse offset distance from an axis of the imaging structure, and wherein an end of the second optical fiber is at a second location on the first surface of the imaging structure, the second location being at a second transverse offset distance from the axis of the imaging structure (block 710). For example, an active alignment can be performed to enable optical coupling between first fiber 102 and second fiber 104 via imaging structure 106. In some implementations, an end of first fiber 102 is at first location 108 on a first surface of imaging structure 106, where first location 108 is at a first transverse offset distance ($d_1$) from axis 112 of imaging structure 106. In some implementations, an end of second fiber 104 is at second location 110 of the first surface of imaging structure 106, where second location 110 is at a second transverse offset distance ($d_2$) from axis 112 of imaging structure 106.

As further shown in FIG. 7, process 700 may include fusion splicing the end of the first optical fiber at the first location on the first surface of the imaging structure (block 720). For example, the end of first fiber 102 may be fusion spliced at first location 108 on the first surface of imaging structure 106, as described above.

As further shown in FIG. 7, process 700 may include fusion splicing the end of the second optical fiber at the second location on the first surface of the imaging structure (block 730). For example, the end of second fiber 104 may be fusion spliced at second location 110 on the first surface of imaging structure 106, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein provide a fiber coupler 100 capable of coupling light reflectively from a first fiber 102 into a second fiber 104 without free-space optics. In some implementations, fiber coupler 100 may include first fiber 202 to launch light at a first location 108 on a first surface of an imaging structure 106, wherein first location 108 is at a first transverse offset distance $d_1$ from an axis 112 of imaging structure 106. Fiber coupler 100 may further include imaging structure 106 to receive the light on a second surface of imaging structure 106, and reflect at least a portion of the light from the second surface of imaging structure 106 such that the at least a portion of the light is imaged at a second location 110 on the first surface of imaging structure 106, where second location 110 is at a second transverse offset distance $d_2$ from axis 112 of imaging structure 106. Fiber coupler 100 may further include second fiber 104 to receive the at least a portion of the light imaged at second location 110 on the second surface of imaging structure 106.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    providing a first optical fiber and a second optical fiber such that an end of the first optical fiber is at a fixed position with respect to an end of the second optical fiber;
    performing an active alignment to enable optical coupling between the first optical fiber and the second optical fiber via a curved endcap structure with a fixed refractive index,
        wherein a center of curvature of the curved endcap structure is located on a first surface of the curved endcap structure, and
        wherein, as a result of the active alignment:
            an end of the first optical fiber is at a first location on the first surface of the curved endcap structure,
                wherein the first location is at a first transverse offset distance from an axis of the curved endcap structure, and
            an end of the second optical fiber is at a second location of the first surface of the curved endcap structure,
                wherein the second location is at a second transverse offset distance from the axis of the curved endcap structure; and
    concurrently fusion splicing the end of the first optical fiber at the first location on the first surface and the end of the second optical fiber at the second location on the first surface,
        wherein at least one of:
            the curved endcap structure is formed from undoped fused silica, or
            the first optical fiber is a pump input fiber and the second optical fiber is an amplifier fiber.

2. The method of claim 1, wherein the concurrent fusion splicing of the end of the first optical fiber at the first location and the end of the second optical fiber at the second location is performed using a single heat source.

3. The method of claim 1, further comprising:
    packaging the first optical fiber, the second optical fiber, and the curved endcap structure to provide strain relief or heatsinking.

4. The method of claim 1, wherein the curved endcap structure is formed from the undoped fused silica.

5. The method of claim 1, wherein the first transverse offset distance matches the second transverse offset distance.

6. The method of claim 1, wherein the first optical fiber is the pump input fiber and the second optical fiber is the amplifier fiber.

7. The method of claim 6, wherein the curved endcap structure comprises a dichroic coating at a second surface of the curved endcap structure.

8. The method of claim 6, wherein the pump input fiber is a multimode fiber and the amplifier fiber is a double-clad fiber or a triple-clad fiber.

9. The method of claim 6, wherein the pump input fiber and the amplifier fiber are single-clad and single-mode fibers.

10. A method, comprising:
fusion splicing an end of a first optical fiber at a first location on a first surface of a curved endcap structure with a fixed refractive index,
wherein a center of curvature of the curved endcap structure is located on the first surface of the curved endcap structure, and
wherein the first location is at a first transverse offset distance from an axis of the curved endcap structure;
performing an active alignment to enable optical coupling between the first optical fiber and a second optical fiber via the curved endcap structure,
wherein, as a result of the active alignment, an end of the second optical fiber is at a second location on the first surface of the curved endcap structure,
wherein the second location is at a second transverse offset distance from the axis of the curved endcap structure; and
fusion splicing the end of the second optical fiber at the second location on the first surface of the curved endcap structure,
wherein at least one of:
the curved endcap structure is formed from undoped fused silica, or
the first optical fiber is a pump input fiber and the second optical fiber is an amplifier fiber.

11. The method of claim 10, wherein the fusion splicing of the end of the first optical fiber at the first location and the fusion splicing of the end of the second optical fiber at the second location is performed using a carbon dioxide laser.

12. The method of claim 10, further comprising:
packaging the first optical fiber, the second optical fiber, and the curved endcap structure to provide strain relief or heatsinking.

13. The method of claim 10, wherein the first transverse offset distance matches the second transverse offset distance.

14. The method of claim 10, wherein the first optical fiber is the pump input fiber and the second optical fiber is the amplifier fiber.

15. A method, comprising:
performing an active alignment to enable optical coupling between a first optical fiber and a second optical fiber via a curved endcap structure with a fixed refractive index,
wherein a center of curvature of the curved endcap structure is located on a first surface of the curved endcap structure,
wherein an end of the first optical fiber is at a first location on the first surface of the curved endcap structure,
the first location being at a first transverse offset distance from an axis of the curved endcap structure, and
wherein an end of the second optical fiber is at a second location on the first surface of the curved endcap structure,
the second location being at a second transverse offset distance from the axis of the curved endcap structure;
fusion splicing the end of the first optical fiber at the first location on the first surface of the curved endcap structure; and
fusion splicing the end of the second optical fiber at the second location on the first surface of the curved endcap structure,
wherein at least one of:
the curved endcap structure is formed from undoped fused silica, or
the first optical fiber is a pump input fiber and the second optical fiber is an amplifier fiber.

16. The method of claim 15, wherein the fusion splicing of the end of the first optical fiber at the first location and the end of the second optical fiber at the second location is performed using a single heat source.

17. The method of claim 15, further comprising:
packaging the first optical fiber, the second optical fiber, and the curved endcap structure to provide strain relief or heatsinking.

18. The method of claim 15, wherein the curved endcap structure is formed from the undoped fused silica.

19. The method of claim 15, wherein the first transverse offset distance matches the second transverse offset distance.

20. The method of claim 15, wherein the first optical fiber is the pump input fiber and the second optical fiber is the amplifier fiber.

* * * * *